(12) United States Patent
Iwasaki et al.

(10) Patent No.: US 6,336,486 B1
(45) Date of Patent: *Jan. 8, 2002

(54) PNEUMATIC RADICAL TIRE HAVING CAP BASE TREAD

(75) Inventors: Shizuo Iwasaki, Kodaira; Kazuo Yagawa, Urawa; Naohiro Sasaka; Kazuo Hayashi, both of Kodaira, all of (JP)

(73) Assignee: Bridgestone Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/052,968

(22) Filed: Apr. 1, 1998

(30) Foreign Application Priority Data

| Apr. 4, 1997 | (JP) | ................................................ 9-086649 |
| Apr. 4, 1997 | (JP) | ................................................ 9-086650 |
| Jan. 19, 1998 | (JP) | ............................................. 10-007551 |

(51) Int. Cl.⁷ .............................. B60C 1/00; B60C 9/12; B60C 11/00

(52) U.S. Cl. ................................ 152/209.4; 152/209.5; 152/209.18

(58) Field of Search ........................... 152/209.5, 209.4, 152/905, 209.18

(56) References Cited

U.S. PATENT DOCUMENTS

| 3,814,160 A | * | 6/1974 | Creasey .................... 152/209.5 |
| 4,381,810 A | * | 5/1983 | Cady et al. ............... 152/209.5 |
| 5,225,011 A | | 7/1993 | Takino et al. |
| 5,526,859 A | * | 6/1996 | Saito et al. ............... 152/209.4 |
| 5,718,782 A | * | 2/1998 | Fourgon ................... 152/209.5 |
| 5,851,321 A | * | 12/1998 | Midorikawa et al. .... 152/209.5 |
| 6,095,217 A | * | 8/2000 | Nakamura et al. ........ 152/209.5 |

FOREIGN PATENT DOCUMENTS

| EP | 0 732 229 A1 | | 9/1996 | |
| EP | 738613 | * | 10/1996 | ............... 152/209.5 |
| EP | 0 738 614 | | 10/1996 | |
| EP | 0 818 501 A1 | | 1/1998 | |
| EP | 0832 920 A1 | | 4/1998 | |
| JP | 58-87138 | * | 5/1983 | .................. 152/905 |
| JP | 3-7602 | * | 1/1991 | ............... 152/209.5 |
| JP | 3-169723 | * | 7/1991 | ............... 152/209.5 |

OTHER PUBLICATIONS

Graf H–J et al.: "Reversionsbestandigkeit Von Naturkautschukmischungen Bei Verwendungvon Di–Thiophosphat-Vulkanisationsystemem" Gummi, Fasern, Kunststoffe Internationale Fachzeitschrift Fur Die Polymer–Verarbeitung, vol. 49, No. 12, Dec. 1996, pp. 984–985.

Blow, Rubber Technology and Manufacture, pp. 349–356, 1971.*

* cited by examiner

*Primary Examiner*—Steven D. Maki
(74) *Attorney, Agent, or Firm*—Sughrue Mion, PLLC (57) ABSTRACT

A pneumatic radial tire comprises a tread portion having a two-layer structure of a cap rubber layer disposed outward in the radial direction and a base rubber layer disposed inward in the radial direction, in which an outer surface of said base rubber layer in the radial direction being existent in a position corresponding to not less than 20% of a depth of a main groove formed in the tread portion outward from a bottom of the main groove in the radial direction, and the base rubber layer being compounded with a recrosslinking inhibition assistant and/or an inorganic compound powder.

17 Claims, 2 Drawing Sheets

PNEUMATIC RADICAL TIRE HAVING CAP BASE TREAD

BACKGROUND OF THE INVENTION

1. Field of the Invention

This invention relates to pneumatic radial tires, and more particularly to a pneumatic radial tire for passenger car controlling the degradation of wet performances such as gripping performance, braking performance and the like on wet road surface at a time from middle worn stage to last worn stage.

2. Description of Related Art

In general, when the tire is mounted onto a vehicle and run over a long distance, it is gradually worn. In this case, tire performances in a new tire are not necessarily the same as tire performances at last worn stage. Particularly, the change of performances on wet road surface is large, which is considered due to the change of rubber properties in addition to a great factor that the volume of the grooves forming a tread pattern is decreased by wearing to lower the drainage efficiency against puddles existing on road. However, it can not be avoided to wear the tire to decrease the groove volume.

In order to control the degradation of wet performances even if the groove volume is decreased by the wearing of the tire, there is proposed a countermeasure wherein rubber having a high friction coefficient $\mu$ against wet road surface (hereinafter referred to as wet-$\mu$) is exposed from a tread rubber at last worn stage to supplement the lowering of the performances due to the decrease of the groove volume with such a high wet-$\mu$. When the tread rubber of the tire has a two-layer structure of a cap rubber layer and a base rubber layer, if rubber having a high wet-$\mu$ is simply applied to the base rubber layer, there is caused a problem that work load in the extrusion operation of base rubber is increased to lower production efficiency.

SUMMARY OF THE INVENTION

It is, therefore, an object of the invention to provide a pneumatic radial tire for passenger car wherein wet-$\mu$ is effectively enhanced at a time from middle worn stage to last worn stage to control the degradation of wet performances without obstructing the productivity.

The inventors have made various studies with respect to the compounding of base rubber from viewpoints of material, production efficiency and performances, concretely the structure and arrangement of the base rubber effectively increasing wet-$\mu$ without obstructing the productivity as well as the compounding of the base rubber controlling the change of rubber properties in use and found that the above problem can be solved by rendering the tread portion into a specified cap/base structure and compounding a recrosslinking inhibition assistant and an inorganic compound powder into the base rubber layer and as a result, the invention has been accomplished.

According to the invention, there is the provision of a pneumatic radial tire comprising a pair of ring-shaped bead cores, a bead filler disposed on the bead core, a carcass toroidally extending between the bead cores and comprised of a rubberized ply containing plural cords arranged side by side in a radial direction and wound around the bead core from inside toward outside to form a turnup portion, a belt of plural belt layers arranged outward on the carcass in the radial direction, an annular tread portion disposed outward on the belt in the radial direction, and a pair of sidewall portions extending from both ends of the tread portion; said tread portion having a two-layer structure of a cap rubber layer disposed outward in the radial direction and a base rubber layer disposed inward in the radial direction, and an outer surface of said base rubber layer in the radial direction being existent in a position corresponding to not less than 20% of a depth of a main groove formed in said tread portion outward from a bottom of said main groove in the radial direction, and said base rubber layer being compounded with a recrosslinking inhibition assistant and/or an inorganic compound powder.

In preferred embodiments of the invention, the base rubber layer is compounded with 0.5–5.0 parts by weight of the recrosslinking inhibition assistant based on 100 parts by weight of rubber ingredient; and the base rubber layer is compounded with not less than 10 parts by weight of the inorganic compound powder based on 100 parts by weight of rubber ingredient; and the inorganic compound powder is compounded into the base rubber layer in an amount of 10–100 parts by weight based on 100 parts by weight of rubber ingredient and into the cap rubber layer in an amount of not more than 50 parts by weight based on 100 parts by weight of rubber ingredient, respectively, provided that the compounding ratio of the inorganic compound powder in the base rubber layer is higher than that in the cap rubber layer; and the recrosslinking inhibition assistant is compounded into the car rubber layer; and the inorganic compound power is silica or aluminum hydroxide; and the recrosslinking inhibition assistant is a metal salt of dithiophosphoric acid, a thiuram type vulcanization accelerator or a 4-methylbenzothiazole type compound; and the outer surface of the base rubber layer in the radial direction is existent in a position from the bottom of the main groove within a range of 30–90%, preferably 40–60% of the main groove depth; and a volume ratio of cap rubber layer to base rubber layer is 1:0.5–1.0; and the base rubber layer is arranged on a central zone of the tread portion at a width corresponding to 40–80% of a ground contact width of the tread portion; and a volume ratio of cap rubber layer to base rubber layer in each of blocks forming the tread pattern at a distance from the bottom of the groove to the outer surface of the tread portion in the radial direction is 9:1–2:8; and the base rubber layer having a convex structure is a main part of a ground contact region at a middle worn stage and then contacts with ground as a main part until at least an appearance of slip sign; and a ratio of the base rubber layer contacting with ground gradually increases as compared with a ratio of the cap rubber layer contacting with ground with the advance of wearing from the middle worn stage; and the friction coefficient of the base rubber layer on wet road surface is at least 105% of that of the cap rubber layer; and the cap rubber layer has a thermal curing ratio of 100–160% after a modulus of elasticity at 300% elongation (M300) is held at 100° C. for 48 hours and the base rubber layer has a thermal curing ratio of 100–150%, provided that the thermal curing ratio of the base rubber layer is lower than that of the cap rubber layer; and the base rubber layer contains not more than 55 parts by weight of an oil based on 100 parts by weight of rubber ingredient; and the base rubber layer contains short fibers.

The term "middle worn stage" used herein means a point of time that the wearing proceeds from the outer surface of the tread portion to a position corresponding to 40–60% of the depth of the main groove in the radial direction of the tire.

BRIEF DESCRIPTION OF THE DRAWINGS

The invention will be described with reference to the accompanying drawings, wherein.

DESCRIPTION OF PREFERRED EMBODIMENTS

Figure 1:
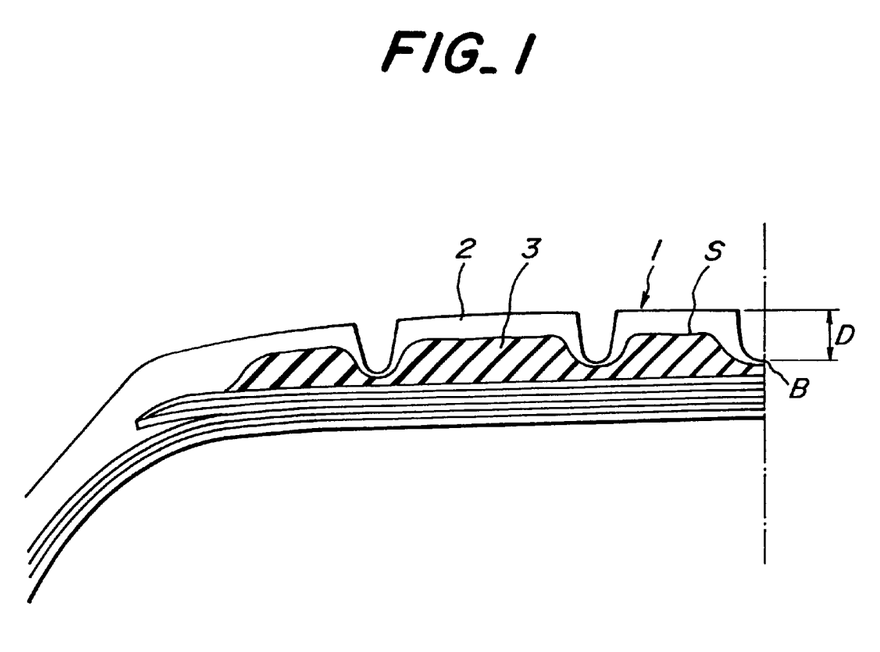
FIG. 1 is a diagrammatically partial section view of an embodiment of the tread portion in the pneumatic radial tire according to the invention.

In an embodiment of the pneumatic radial tire according to the invention, as shown in FIG. 1, a tread portion 1 has a two-layer structure of a cap rubber layer 2 and a base rubber layer 3, in which a recrosslinking inhibition assistant and/or an inorganic compound powder are compounded with a rubber composition in at least a base rubber layer.

The inorganic compound powder, may be silica, aluminum hydroxide, magnesium hydroxide, clay and the like. Among them, silica or aluminum hydroxide is preferable. The inorganic compound powder is compounded in an amount of not less than 10 parts by weight, preferably 10–100 parts by weight, more particularly 20–70 parts by weight based on 100 parts by weight of rubber ingredient. In this way, the gripping force on wet road surface is made higher and also the wet performances can be maintained at good state even in the last worn stage. Moreover, if the amount of the inorganic compound powder exceeds 100 parts by weight, the effect of improving the wet performances is saturated and the more improvement can not be expected and such an amount is unfavorable in the cost.

Further, the inventors have confirmed that the tread rubber is hardened by the recrosslinking between polymers in rubber to change the rubber properties and hence the gripping force of the tire lowers. Hence, it is important to control the degradation of the wet performances on or after the middle worn stage by inhibiting the recrosslinking. In the pneumatic radial tire according to the invention, therefore, the recrosslinking inhibition assistant is compounded with a rubber composition for the base rubber layer 3 instead of the inorganic compound powder, or may be compounded together with the inorganic compound powder. In this case, the amount of the recrosslinking inhibition assistant compounded is 0.5–5.0 parts by weight based on 100 parts by weight of rubber ingredient. When the amount is less than 0.5 part by weight, the effect of inhibiting the recrosslinking is not sufficiently obtained. When it exceeds 5.0 parts by weight, the improving effect is saturated and further improvement can not be expected.

As the recrosslinking inhibition assistant, it is preferable to use a metal salt of dithiophosphoric acid, a thiuram type vulcanization accelerator or a 4-methylbenzothiazole type compound.

As the metal salt of dithiophosphoric acid, mention may be made of zinc O,O'-dibutyldithiophosphate, zinc O,O'-diisopropyldithiophosphate, zinc O,O'-dipropyldithiophosphate, zinc O,O'-dimethyldithiophosphate, zinc O,O'-diethyldithiophosphate, zinc O,O'-bis(2-ethylhexyl) dithiophosphate, zinc O,O'-bis(4-methylpentyl) dithiophosphate, zinc O,O'-octadecyldithiophosphate, antimony O,O'-dibutyl-dithiophosphate, antimony O,O'-diisopropyldithiophosphate, antimony O,O'-dipropyldithiophosphate, antimony O,O'-dimethyldithiophosphate, antimony O,O'-diethyldithiophosphate, antimony O,O'-bis(2-ethylhexyl) dithiophosphate, antimony O,O'-bis(4-methylpentyl) dithiophosphate, antimony O,O'-octadecyldithiophosphate, copper O,O'-dibutyldithiophosphate, copper O,O'-diisopropyl-dithiophosphate, copper O,O'-dipropyldithiophosphate, copper O,O'-dimethyldithiophosphate, copper O,O'-diethyldithiophosphate, copper O,O'-bis(2-ethylhexyl) dithiophosphate, copper O,O'-bis(4-methylpentyl) dithiophosphate, copper O,O'-octadecyldithiophosphate, iron O,O'-dibutyldithiophosphate, iron O,O'-diisopropyl-dithiophosphate, iron O,O'-dipropyldithiophosphate, iron O,O'-dimethyldithiophosphate, iron O,O'-diethyldithiophosphate, iron O,O'-bis(2-ethylhexyl) dithiophosphate, iron O,O'-bis(4-methylpentyl) dithiophosphate, iron O,O'-octadecyldithiophosphate, O,O'-dibutyldithiophosphoric disulfide, O,O'-diisopropyldithiophosphoric disulfide, O,O'-dipropyldithiophosphoric disulfide, O,O'-dimethyldithiophosphoric disulfide, O,O'-diethyldithiophosphoric disulfide, O,O'-bis(2-ethylhexyl) dithiophosphoric disulfide, O,O'-bis(4-methylpentyl) dithiophosphoric disulfide, O,O'-octadecyldithiophosphoric disulfide, O,O'-dibutyldithiophosphoric tetrasulfide, O,O'-diisopropyldithiophosphoric tetrasulfide, O,O'-dipropyldithiophosphoric tetrasulfide, O,O'-dimethyldithiophosphoric tetrasulfide, O,O'-diethyldithiophosphoric tetrasulfide, O,O'-bis(2-ethylhexyl) dithiophosphoric tetrasulfide, O,O'-bis(4-methylpentyl) dithiophosphoric tetrasulfide, O,O'-octadecyldithiophosphoric tetrasulfide and the like.

As the thiuram type vulcanization accelerator, mention may be made of tetramethylthiuram disulfide, tetraethylthiuram disulfide, tetrakis(2-ethylhexyl)thiuram disulfide, tetrabenzylthiuram disulfide, tetraisobutylthiuram disulfide, tetrabutylthiuram disulfide and the like.

As the 4-methylbenzothiazole type compound, mention may be made of 4-methyl-2-mercaptobenzothiazole, 4-ethyl-2-mercaptobenzothiazole, 4-propyl-2-mercaptobenzothiazole, 4-methoxy-2-mercaptobenzothiazole, 4-ethoxy-2-mercaptobenzothiazole, 4-propoxy-2-mercaptobenzothiazole, 2,2-dithiobis(4-methylbenzothiazole), 2,2-dithiobis(4-ethylbenzothiazole), 2,2-dithiobis(4-propylbenzothiazole), 2,2-dithiobis(4-methoxybenzothiazole), 2,2-dithiobis(4-ethoxybenzothiazole), 2,2-dithiobis(4-propoxybenzothiazole), zinc salt of 4-methyl-2-mercaptobenzothiazole, zinc salt of 4-ethyl-2-mercaptobenzothiazole, zinc salt of 4-propyl-2-mercaptobenzothiazole, zinc salt of 4-methoxy-2-mercaptobenzothiazole, zinc salt of 4-ethoxy-2-mercaptobenzothiazole, zinc salt of 4-propoxy-2-mercaptobenzothiazole, copper salt of 4-methyl-2-mercaptobenzothiazole, copper salt of 4-ethyl-2-mercaptobenzothiazole, copper salt of 4-propyl-2-mercaptobenzothiazole, copper salt of 4-methoxy-2-mercaptobenzothiazole, copper salt of 4-ethoxy-2-mercaptobenzothiazole, copper salt of 4-propoxy-2-mercaptobenzothiazole, N-cyclohexyl-4-methyl-2-benzothiazolyl sulfenamide, N-cyclohexyl-4-ethyl-2-benzothiazolyl sulfenamide, N-cyclohexyl-4-propyl-2-benzothiazolyl sulfenamide, N-cyclohexyl-4-methoxy-2-benzothiazolyl sulfenamide, N-cyclohexyl-4-ethoxy-2-benzothiazolyl sulfenamide, N-cyclohexyl-4-propoxy-2-benzothiazolyl sulfenamide, N-tert-butyl-4-methyl-2-benzothiazolyl sulfenamide, N-tert-butyl-4-ethyl-2-benzothiazolyl sulfenamide, N-tert-butyl-4-propyl-2-benzothiazolyl sulfenamide, N-tert-butyl-4-methoxy-2-benzothiazolyl sulfenamide, N-tert-butyl-4-ethoxy-2-benzothiazolyl sulfenamide, N-tert-butyl-4-propoxy-2-benzothiazolyl sulfenamide, N,N-dicyclohexyl-4-methyl-2-benzothiazolyl sulfenamide, N,N-dicyclohexyl-4-ethyl-2-benzothiazolyl sulfenamide, N,N-dicyclohexyl-4-propyl-2-benzothiazolyl sulfenamide, N,N-dicyclohexyl-4-methoxy-2-benzothiazolyl sulfenamide, N,N-dicyclohexyl-4-ethoxy-2-benzothiazolyl sulfenamide, N,N-dicyclohexyl-4-propoxy-2-benzothiazolyl sulfenamide, N-tert-butyl-4-methyl-2-benzothiazolyl sulfenimide, N-tert-butyl-4-ethyl-2-benzothiazolyl sulfenimide, N-tert-butyl-4-propyl-2-benzothiazolyl sulfenimide, N-tert-butyl-4-methoxy-2-benzothiazolyl sulfenimide, N-tert-butyl-4-ethoxy-2-benzothiazolyl sulfenimide, N-tert-butyl-4-propoxy-2-benzothiazolyl sulfenimide, 5-methoxy-2-mercaptobenzothiazole, 6-methoxy-2- mercaptobenzothiazole, 7-methoxy-2-mercaptobenzothiazole, 5-ethoxy-2-mercaptobenzothiazole, 6-ethoxy-2-mercaptobenzothiazole, 7-ethoxy-2-mercaptobenzothiazole, 4-butoxy-2-mercaptobenzothiazole, 5-butoxy-2-mercaptobenzothiazole, 6-butoxy-2-mercaptobenzothiazole, 7-butoxy-2-mercaptobenzothiazole, N-tert-butyl-4-methoxy-2-benzothiazolyl sulfenamide, N-tert-butyl-5-methoxy-2-benzothiazolyl sulfenamide, N-tert-butyl-6-methoxy-2-benzothiazolyl sulfenamide, N-tert-butyl-7-methoxy-2-benzothiazolyl sulfenamide, N-tert-butyl-4-ethoxy-2-benzothiazolyl sulfenamide, N-tert-butyl-5-ethoxy-2-benzothiazolyl sulfenamide, N-tert-butyl-6-ethoxy-2-benzothiazolyl sulfenamide, N-tert-butyl-7-ethoxy-2-benzothiazolyl sulfenamide, N-tert-butyl-4-butoxy-2-benzothiazolyl sulfenamide, N-tert-butyl-5-butoxy-2-benzothiazolyl sulfenamide, N-tert-butyl-6-butoxy-2-benzothiazolyl sulfenamide, N-tert-butyl-7-butoxy-2-benzothiazolyl sulfenamide, N-ethyl-4-methoxy-2-benzothiazolyl sulfenamide, N-ethyl-5-methoxy-2-benzothiazolyl sulfenamide, N-ethyl-6-methoxy-2-benzothiazolyl sulfenamide, N-ethyl-7-methoxy-2-benzothiazolyl sulfenamide, N-ethyl-4-ethoxy-2-benzothiazolyl sulfenamide, N-ethyl-5-ethoxy-2-benzothiazolyl sulfenamide, N-ethyl-6-ethoxy-2-benzothiazolyl sulfenamide, N-ethyl-7-ethoxy-2-benzothiazolyl sulfenamide, N-ethyl-4-butoxy-2-benzothiazolyl sulfenamide, N-ethyl-5-butoxy-2-benzothiazolyl sulfenamide, N-ethyl-6-butoxy-2-benzothiazolyl sulfenamide, N-ethyl-7-butoxy-2-benzothiazolyl sulfenamide, N-cyclohexyl-4-methoxy-2-benzothiazolyl sulfenamide, N-cyclohexyl-5-methoxy-2-benzothiazolyl sulfenamide, N-cyclohexyl-6-methoxy-2-benzothiazolyl sulfenamide, N-cyclohexyl-7-methoxy-2-benzothiazolyl sulfenamide, N-cyclohexyl-4-ethoxy-2-benzothiazolyl sulfenamide, N-cyclohexyl-5-ethoxy-2-benzothiazolyl sulfenamide, N-cyclohexyl-6-ethoxy-2-benzothiazolyl sulfenamide, N-cyclohexyl-7-ethoxy-2-benzothiazolyl sulfenamide, N-cyclohexyl-4-butoxy-2-benzothiazolyl sulfenamide, N-cyclohexyl-5-butoxy-2-benzothiazolyl sulfenamide, N-cyclohexyl-6-butoxy-2-benzothiazolyl sulfenamide, N-cyclohexyl-7-butoxy-2-benzothiazolyl sulfenamide, N,N-dicyclohexyl-4-methoxy-2-benzothiazolyl sulfenamide, N,N-dicyclohexyl-5-methoxy-2-benzothiazolyl sulfenamide, N,N-dicyclohexyl-6-methoxy-2-benzothiazolyl sulfenamide, N,N-dicyclohexyl-7-methoxy-2-benzothiazolyl sulfenamide, N,N-dicyclohexyl-4-ethoxy-2-benzothiazolyl sulfenamide, N,N-dicyclohexyl-5-ethoxy-2-benzothiazolyl sulfenamide, N,N-dicyclohexyl-6-ethoxy-2-benzothiazolyl sulfenamide, N,N-dicyclohexyl-7-ethoxy-2-benzothiazolyl sulfenamide, N,N-dicyclohexyl-4-butoxy-2-benzothiazolyl sulfenamide, N,N-dicyclohexyl-5-butoxy-2-benzothiazolyl sulfenamide, N,N-dicyclohexyl-6-butoxy-2-benzothiazolyl sulfenamide, N,N-dicyclohexyl-7-butoxy-2-benzothiazolyl sulfenanide, di-4-methoxy-2-benzothiazolyl disulfide, di-5-methoxy-2-benzothiazyl disulfide, di-6-methoxy-2-benzothiazyl disulfide, di-7-methoxy-2-benzothiazyl disulfide, di-4-ethoxy-2-benzothiazyl disulfide, di-5-ethoxy-2-benzothiazyl disulfide, di-6-ethoxy-2-benzothiazyl disulfide, di-7-ethoxy-2-benzothiazyl disulfide, di-4-butoxy-2-benzothiazyl disulfide, di-5-butoxy-2-benzothiazyl disulfide, di-6-butoxy-2-benzothiazyl disulfide, di-7-butoxy-2-benzothiazyl disulfide, zinc salt of 4-methoxy-2-mercaptobenzothiazole, zinc salt of 5-methoxy-2-mercaptobenzothiazole, zinc salt of 6-methoxy-2-mercaptobenzothiazole, zinc salt of 7-methoxy-2-mercaptobenzothiazole, zinc salt of 4-ethoxy-2-mercaptobenzothiazole, zinc salt of 5-ethoxy-2-mercaptobenzothiazole, zinc salt of 6-ethoxy-2-mercaptobenzothiazole, zinc salt of 7-ethoxy-2-mercaptobenzothiazole, zinc salt of 4-butoxy-2-mercaptobenzothiazole, zinc salt of 5-butoxy-2-mercaptobenzothiazole, zinc salt of 6-butoxy-2-mercaptobenzothiazole, zinc salt of 7-butoxy-2-mercaptobenzothiazole, copper salt of 4-methoxy-2-mercaptobenzothiazole, copper salt of 5-methoxy-2-mercaptobenzothiazole, copper salt of 6-methoxy-2-mercaptobenzothiazole, copper salt of 7-methoxy-2-mercaptobenzothiazole, copper salt of 4-ethoxy-2-mercaptobenzothiazole, copper salt of 5-ethoxy-2-mercaptobenzothiazole, copper salt of 6-ethoxy-2-mercaptobenzothiazole, copper salt of 7-ethoxy-2-mercaptobenzothiazole, copper salt of 4-butoxy-2-mercaptobenzothiazole, copper salt of 5-butoxy-2-mercaptobenzothiazole, copper salt of 6-butoxy-2-mercaptobenzothiazole, copper salt of 7-butoxy-2-mercaptobenzothiazole, N-ethyl-(4-methoxy-2-benzothiazolyl) sulfenimide, N-ethyl-(5-methoxy-2-benzothiazolyl) sulfenimide, N-ethyl-(6-methoxy-2-benzothiazolyl) sulfenimide, N-ethyl-(7-methoxy-2-benzothiazolyl) sulfenimide, N-tert-butyl-(4-methoxy-2-benzothiazolyl) sulfenimide, N-tert-butyl-(5-methoxy-2-benzothiazolyl) sulfenimide, N-tert-butyl-(6-methoxy-2-benzothiazolyl) sulfenimide, N-tert-butyl-(7-methoxy-2-benzothiazolyl) sulfenimide, N-cyclohexyl-(4-methoxy-2-benzothiazolyl) sulfenimide, N-cyclohexyl-(5-methoxy-2-benzothiazolyl) sulfenimide, N-cyclohexyl-(6-methoxy-2-benzothiazolyl) sulfenimide, N-cyclohexyl-(7-methoxy-2-benzothiazolyl) sulfenimide, N-ethyl-(4-ethoxy-2-benzothiazolyl) sulfenimide, N-ethyl-(5-ethoxy-2-benzothiazolyl) sulfenimide, N-ethyl-(6-ethoxy-2-benzothiazolyl) sulfenimide, N-ethyl-(7-ethoxy-2-benzothiazolyl) sulfenimide, N-tert-butyl-(4-ethoxy-2-benzothiazolyl) sulfenimide, N-tert-butyl-(5-ethoxy-2-benzothiazolyl) sulfenimide, N-tert-butyl-(6-ethoxy-2-benzothiazolyl) sulfenimide, N-tert-butyl-(7-ethoxy-2-benzothiazolyl) sulfenimide, N-cyclohexyl-(4-ethoxy-2-benzothiazolyl) sulfenimide, N-cyclohexyl-(5-ethoxy-2-benzothiazolyl) sulfenimide, N-cyclohexyl-(6-ethoxy-2-benzothiazolyl) sulfenimide, N-cyclohexyl-(7-ethoxy-2-benzothiazolyl) sulfenimide, N-ethyl-(4-butoxy-2-benzothiazolyl) sulfenimide, N-ethyl-(5-butoxy-2-benzothiazolyl) sulfenimide, N-ethyl-(6-butoxy-2-benzothiazolyl) sulfenimide, N-ethyl-(7-butoxy-2-benzothiazolyl) sulfenimide, N-tert-butyl-(4-butoxy-2-benzothiazolyl) sulfenimide, N-tert-butyl-(5-butoxy-2-benzothiazolyl) sulfenimide, N-tert-butyl-(6-butoxy-2-benzothiazolyl) sulfenimide, N-tert-butyl-(7-butoxy-2-benzothiazolyl) sulfenimide, N-cyclohexyl-(4-butoxy-2-benzothiazolyl) sulfenimide, N-cyclohexyl-(5-butoxy-2-benzothiazolyl) sulfenimide, N-cyclohexyl-(6-butoxy-2-benzothiazolyl) sulfenimide, N-cyclohexyl-(7-butoxy-2-benzothiazolyl) sulfenimide, 2-mercapto-4-methylbenzothiazole, 2-mercapto-4-ethylbenzothiazole, 2-mercapto-5-methylbenzothiazole, 2-mercapto-5-ethylbenzothiazole, 2-mercapto-6-methylbenzothiazole, 2-mercapto-6-ethylbenzothiazole, 2-mercapto-4,5-dimethylbenzothiazole, 2-mercapto-4,5-diethylbenzothiazole, 2-mercapto-4-phenylbenzothiazole, 2-mercapto-5-phenylbenzothiazole, 2-mercapto-6-phenylbenzothiazole, bis-(4-methylbenzothiazyl-2) disulfide, bis-(4-ethylbenzothiazyl-2) disulfide, bis-(5-methylbenzothiazyl-2) disulfide, bis-(5-ethylbenzothiazyl-2) disulfide, bis-(6-methylbenzothiazyl-2) disulfide, bis-(6-ethylbenzothiazyl-2) disulfide, bis-(4,5-dimethylbenzothiazyl-2) disulfide, bis-(4,5-diethylbenzothiazyl-2) disulfide, bis-(5-phenylbenzothiazyl-2) disulfide, bis-(6-phenylbenzothiazyl-2) disulfide and the like.

As the recrosslinking inhibition assistant, bis-(4-methylbenzothiazyl-2) disulfide, bis-(5- methylbenzothiazyl-2) disulfide, mercapto-4-methylbenzothiazole, mercapto-5-methylbenzothiazole, zinc O,O'-dibutyldithiophosphate, zinc O,O'-diisopropyldithiophosphate and the like are favorable among the above compounds.

In the invention, the inorganic compound powder may be compounded into the cap rubber layer 2 in an amount of not more than 50 parts by weight based on 100 parts by weight of rubber ingredient. In this case, it is favorable that the compounding ratio of the inorganic compound powder in the base rubber layer 3 is made higher than that in the cap rubber layer 2 for controlling the degradation of the wet performances at the last worn stage. That is, when the inorganic compound powder is compounded into the cap rubber layer in an amount exceeding 50 parts by weight based on 100 parts by weight of rubber ingredient, the balance of performances between the cap rubber and the base rubber is damaged and also undesirable result is obtained in the antistatic way. And also, the recrosslinking inhibition assistant may be compounded into the cap rubber layer according to the invention, whereby the degradation of the wet performances can be controlled until the base rubber layer 3 is exposed to exterior.

In the invention, it is favorable to include not less than 70 parts by weight of styrene-butadiene rubber (SBR) based on 100 parts by weight of rubber ingredient in at least the base rubber layer among the cap rubber layer 2 and the base rubber layer 3. When the amount of SBR is less than 70 parts by weight, it is difficult to obtain the steering stability required in the high running-performance tire.

When carbon black is added as a filler, it is favorable that a total amount of the inorganic compound powder and carbon black is 50–130 parts by weight. If the total amount is less than 50 parts by weight, the steering stability can not be improved, while if it exceeds 130 parts by weight, the high-speed durability lowers and also the dispersion of the filler can not be attained and hence the wear resistance is considerably degraded. Preferably, the carbon black used has a nitrogen adsorption specific surface area ($N_2SA$) of 80–180 $m^2/g$ according to ASTM D4820-93 and a dibutylphthalate oil absorption (DBP) of not less than 90 $cm^3/$100 g according to ASTM D2414-93. When N2SA is less than 80 $m^2/g$, the wear resistance is insufficient. When it exceeds 180 $m^2/g$, the heat build-up is degraded and also the dispersion of carbon black is poor to lower the high-speed durability.

According to the invention, the base rubber layer 3 is preferable to be located on a central portion of the tread at a width corresponding to 40–80% of a ground contact width of the tread because the central portion of the tread takes a great part in the wet performances. When the width is less than 40%, even if the base rubber layer is exposed to exterior, the effect of improving the wet performances can not sufficiently be developed. When it exceeds 80%, the productivity is undesirably degraded. Moreover, the term "ground contact width" used herein means a value measured when the tire is mounted onto an approved rim defined in JATMA and contacted with ground at an internal pressure of 2.0 $kgf/cm^2$ under a loading corresponding to this internal pressure.

Furthermore, as shown in FIG. 1, an outer surface S of the base rubber layer 3 in the radial direction is existent outward from a bottom B of a main groove formed in the tread in a position corresponding to at least 20%, preferably 30–90%, more particularly 40–60% of a depth D of the main groove. When the upper end of the base rubber layer 3 is located in a position from the groove bottom to not less than 20% of the groove depth, a portion of the base rubber is exposed on or after the middle worn stage to contribute to the improvement of the wet performances. Particularly, when the upper end of the base rubber layer 3 is within a range of 30–90% of the groove depth from the groove bottom, a given portion of the base rubber is exposed just at the middle worn stage, whereby the object of the invention can sufficiently be attained. Moreover, such an arrangement of the base rubber layer may be attained by optimizing a volume ratio of the cap rubber layer 2 to the base rubber layer 3. In this case, the functions of the cap rubber layer and the base rubber layer can be separated form each other by arranging an effective material onto a portion most contributing to the improvement of the performances. The volume ratio of cap rubber layer 2 to base rubber layer 3 is preferably 1:0.5–1.0, more particularly 1:0.6–1:0.8. If the amount of either cap rubber or base rubber becomes extremely large, the production efficiency lowers from a viewpoint of rubber extrusion rate, so that the volume ratio is desirable to be maintained at the above range.

Figure 2A:
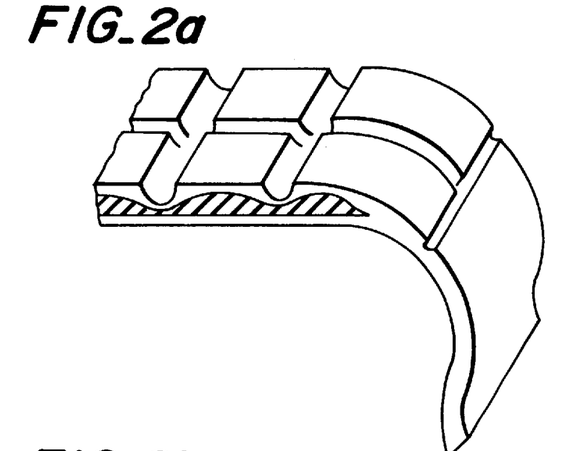
FIGS. 2a–2c are schematic views illustrating a worn state of a tread portion in the pneumatic radial tire according to the invention, respectively.
Figure 2B:
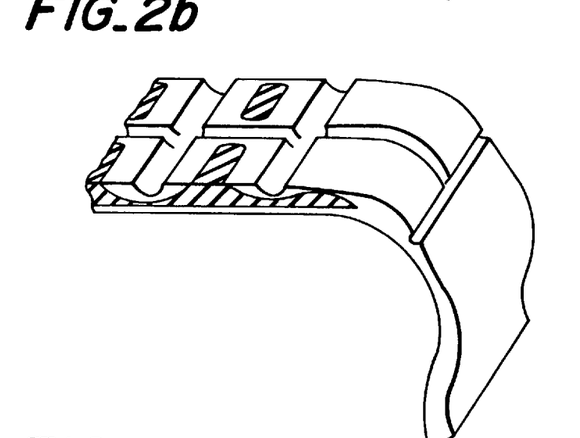
Figure 2C:
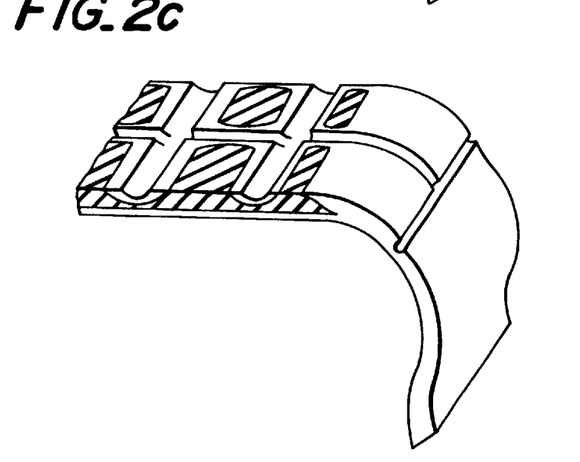

Moreover, the base rubber is favorable to be inserted into the cap rubber in form of a mountain so that a volume ratio of cap rubber layer to base rubber layer in each of blocks forming the tread pattern at a distance from the bottom of the groove to the outer surface of the tread portion in the radial direction is 9:1–2:8. In this case, the base rubber is gradually exposed at a certain worn stage to gradually improve the wet performances, which is preferable in view of safeness. Preferably, the base rubber layer 3 having the above convex structure is a main part of the ground contact region at the middle worn stage and then contacts with ground as a main part until at least an appearance of slip sign. Similarly, a ratio of the base rubber layer 3 contacting with ground gradually increases as compared with a ratio of the cap rubber layer contacting with ground with the advance of wearing from the middle worn stage. The state that the base rubber controlling the degradation of the wet performances gradually appears from the middle worn stage is shown in FIGS. 2a–2c. FIG. 2a shows a new tire, FIG. 2b shows a stage of about 50% wear, and FIG. 2c shows a stage of about 70% wear. By rendering the tread portion into the above cap/base structure can be controlled not only the degradation of the wet performances but also the degradation of silence, ride comfort and the like.

In order to largely control the degradation of the wet performances and the like on or after the middle worn stage, it is favorable to set the wet-$\mu$ of the base rubber layer to at least 105% of that of the cap rubber layer in addition to the adoption of the above cap/base structure. When the ratio of wet-$\mu$ is less than 105%, the balance in the performances between cap rubber and base rubber is undesirably damaged.

Furthermore, it is favorable that the cap rubber layer has a thermal curing ratio of 100–160% after a modulus of elasticity at 300% elongation (M300) is held at 100° C. for 48 hours and the base rubber layer has a thermal curing ratio of 100–150%, provided that the thermal curing ratio of the base rubber layer is lower than that of the cap rubber layer. When the thermal curing ratio of the cap rubber exceeds 160% or that of the base rubber exceeds 150%, the effect of controlling the degradation of the wet performances is insufficient. The reason why the thermal curing ratio of the base rubber layer is lower than that of the cap rubber layer is due to the fact that the base rubber is used over a long time of period up to last running stage to maintain the effect of controlling the degradation of the wet performances.

Also, an amount of oil in the base rubber layer 3 is restricted to not more than 55 parts by weight, preferably not more than 30 parts by weight based on 100 parts by weight of rubber ingredient, whereby the change of rubber properties is lessened.

According to the invention, in order to differ the properties between the cap rubber layer 2 and the base rubber layer 3 and particularly control the shrinkage of base rubber to improve the operability in the tire building-up, short fibers may be compounded into the base rubber layer in an amount of 0.5–5 parts by weight based on 100 parts by weight of rubber ingredient. The kind of the short fiber is not particularly critical, but the use of polyamide, polyethylene terephthalate, polyvinyl, polypropylene polyethylene or the like is favorable. Moreover, the use of the short fiber having about 1–20 deniers is effective to prevent the shrinkage of rubber.

Moreover, the rubber composition used for the cap rubber and the base rubber constituting the tread of the pneumatic radial tire according to the invention may be compounded with proper amounts of an antioxidant, a wax, a vulcanization accelerator, a silane coupling agent, a dispersing agent and the like in addition to the above ingredients. In the structure of the tire other than the tread portion, there can be adopted a structure usually used in the conventional pneumatic radial tire.

The following examples are given in illustration of the invention and are not intended as limitations thereof.

EXAMPLES 1–5

Comparative Example 1

Various tires having a tire size of 205/55R16 are prepared by using rubbers IA-IE shown in Table 1 as cap rubber and base rubber in the tread portion of the tire, respectively.

Moreover, the measurement of wet-$\mu$ with respect to each sample of the rubbers IA-IE is conducted by using a portable skid tester made by Stanley Corporation at 25° C. on a surface of a concrete road. The measurement is repeated 10 times per one sample. The wet-$\mu$ is represented as an average of 8 measured values other than highest and lowest values by an index on the basis that the rubber composition IA is 100, in which the larger the index value, the better the wet gripping property.

TABLE 1

| Kind of rubber | | IA | IB | IC | ID | IE |
|---|---|---|---|---|---|---|
| Compounding recipe (part by weight) | SBR[1] | 82.5 | 82.5 | 82.5 | 82.5 | 82.5 |
| | SBR[2] | 55 | 55 | 55 | 55 | 55 |
| | carbon black[3] | 80 | 55 | 40 | 75 | 55 |
| | silica[4] | — | 25 | 40 | 5 | — |
| | aluminum hydroxide[5] | — | — | — | — | 25 |
| | silane coupling agent[6] | — | 2.5 | 4.0 | 0.5 | — |
| | aromatic oil | 7.5 | 7.5 | 7.5 | 7.5 | 7.5 |
| Wet-$\mu$ (index) | | 100 | 106 | 107 | 102 | 106 |

[1]Trade name: #1712, made by JSR Corporation
[2]Trade name: #1721, made by JSR Corporation
[3]Trade name: Seast 3H
[4]Trade name: Nipsil AQ, made by Nippon Silica Kogyo K.K.
[5]Trade name: Higirite 43M, made by Showa Denko K.K.
[6]Trade name: Si69, made by Degussa Then, the wet performances are evaluated by an actual running test with respect to each of the above tires. In this case, the actual running test is carried out by providing two kinds of the tire, i.e. a new tire and a tire cutting off the tread portion so as to have a remaining groove depth of 2 mm assuming the last worn stage and running these tires on wet road surface, during which the handling on wet road surface is evaluated by a professional driver's feeling at 10 points. Moreover, the ground contact width is measured from a foot print on a flat face under conditions that the rim size is 6.5JJ×16, an internal pressure is 2.0 kgf/cm² and a loading is 520 kg. The evaluation results are shown in Table 2.

TABLE 2

| | | Comparative Example 1 | Example 1 | Example 2 | Example 3 | Example 4 | Example 5 |
|---|---|---|---|---|---|---|---|
| Kind of rubber | cap rubber | IA | IA | IA | IA | IB | IA |
| | base rubber | IA | IB | IC | ID | IC | IE |
| Tread structure | width of base rubber to ground contact width of tread (%) | — | 60 | 60 | 60 | 60 | 60 |
| | ratio of outer surface of base rubber from groove bottom to depth of main groove (%) | — | 50 | 50 | 50 | 50 | 50 |
| | cap rubber/base rubber (volume ratio) | — | 1/0.7 | 1/0.7 | 1/0.7 | 1/0.7 | 1/0.7 |
| | cap rubber: base rubber in block (volume ratio) | — | 7:5 | 7:5 | 7:5 | 7:5 | 7:5 |
| Wet performance (new tire) | | 6.5 | 6.5 | 6.5 | 6.5 | 7.5 | 6.5 |
| Wet performance (worn tire) | | 4.0 | 5.0 | 6.0 | 4.5 | 6.0 | 5.0 |
| Difference in wet performance between new tire and worn tire | | 2.5 | 1.5 | 0.5 | 2.0 | 1.5 | 1.5 |

Comparative Example 1 is a tire having the conventional type tread structure and is large in the difference of wet performance between new tire and worn tire. In Examples 1, 2 and 4, silica as the inorganic compound powder is compounded into the base rubber, so that the wet performance is high at the worn stage and the difference of wet performance between new tire and worn tire is not more than 1.5 and the driver's feeling on such a performance difference is small. The similar result is obtained even in Example 5. In Example 3, the silica amount in the base rubber is less, so that the difference of wet performance between new tire and worn tire is somewhat large but is smaller than that of Comparative Example 1.

EXAMPLES 6–8

Comparative Examples 2–3

Various tires having a tire size of 205/55R16 are prepared by using rubbers IIA-IID shown in Table 3 as cap rubber and base rubber in the tread portion of the tire, respectively. The wet-$\mu$ of each of the rubbers IIA-IID and wet-$\mu$ after a shelf test thereof are measured to obtain results as shown in Table 3. Moreover, the measurement of the wet-$\mu$ is carried out by the same method as described in Example 1, and the wet-$\mu$ after the shelf test is carried out by the same method as described in Example 1 after the rubber sample is left to stand in an oven at 60° C. for 30 days. In any case, the wet-$\mu$ is represented by an index on the basis that the rubber composition IIA is 100, in which the larger the index value, the better the wet gripping property.

TABLE 3

| Kind of rubber | | IIA | IIB | IIC | IID |
|---|---|---|---|---|---|
| Compounding recipe (part by weight) | SBR[1] | 110 | 82.5 | 82.5 | 82.5 |
| | SBR[2] | 0 | 55 | 55 | 55 |
| | natural rubber | 20 | 0 | 0 | 0 |
| | carbon black[3] | 80 | 80 | 80 | 80 |
| | aromatic oil | 15 | 7.5 | 7.5 | 7.5 |
| | recrosslinking inhibition assistant[7] | — | — | 0.5 | 5 |
| Wet-$\mu$ (index) | | 100 | 107 | 107 | 107 |
| Wet-$\mu$ after shelf test (index) | | 92 | 99 | 104 | 105 |

[1]Trade name: #1712, made by JSR Corporation
[2]Trade name: #1721, made by JSR Corporation
[3]Trade name: Seast 3H
[7]zinc O,O'-diisopropyl dithiophosphate Then, the wet performances are evaluated by the same method as described in Example 1 with respect to each of the above tires. The evaluation results are shown in Table 4.

TABLE 4

| | | Comparative Example 2 | Example 6 | Example 7 | Comparative Example 3 | Example 8 |
|---|---|---|---|---|---|---|
| Kind of rubber | cap rubber | IIA | IIA | IIA | IIA | IIB |
| | base rubber | IIA | IIC | IID | IIB | IIC |
| Tread structure | width of base rubber to ground contact width of tread (%) | — | 60 | 60 | 60 | 60 |
| | ratio of outer surface of base rubber from groove bottom to depth of main groove (%) | — | 50 | 50 | 50 | 50 |
| | cap rubber/base rubber (volume ratio) | — | 1:0.7 | 1:0.7 | 1:0.7 | 1:0.7 |
| | cap rubber: base rubber in block (volume ratio) | — | 6:4 | 6:4 | 6:4 | 6:4 |
| Wet performance (new tire) | | 6.5 | 6.5 | 6.5 | 6.5 | 7.5 |
| Wet performance (worn tire) | | 4.0 | 5.5 | 6.0 | 4.5 | 5.5 |
| Difference in wet performance between new tire and worn tire | | 2.5 | 1.0 | 0.5 | 2.0 | 2.0 |

Comparative Example 2 is a tire having the conventional type tread structure and is large in the difference of wet performance between new tire and worn tire. In Examples 6 and 7, the recrosslinking inhibition assistant is compounded into the base rubber, so that the wet performance is high at the worn stage and the difference of wet performance between new tire and worn tire is not more than 1.0 and the driver's feeling on such a performance difference is small. In Example 8, the difference of wet performance between new tire and worn tire is somewhat large as compared with those of the other examples, but the wet performance at the worn stage is maintained at an approximately equal level to that of Example 6. On the contrary, the recrosslinking inhibition assistant is not compounded into the base rubber in Comparative Example 3, so that the difference of wet performance between new tire and worn tire becomes larger.

EXAMPLES 9–14

Comparative Example 4

Various tires having a tire size of 205/55R16 are prepared by using rubbers IIIA-IIIG shown in Table 5 as cap rubber and base rubber in the tread portion of the tire, respectively. The wet-$\mu$ of each of the rubbers IIIA-IIIG is measured by the same method as described in Example 1 to obtain results as shown in Table 5. Moreover, the wet-$\mu$ is represented by an index on the basis that the rubber composition IIIA is 100, in which the larger the index value, the better the wet gripping property.

As to thermal curing ratio after each of the rubbers IIIA-IIIG is held at 100° C. for 48 hours, the hardness (Hd) and modulus of elasticity at 300% elongation (M300) are measured by using a dumbbell-shaped sample of JIS No. 3 according to a test of JIS K6300. The measured values are also shown in Table 5.

TABLE 5

| | Kind of rubber | IIIA | IIIB | IIIC | IIID | IIIE | IIIF | IIIG |
|---|---|---|---|---|---|---|---|---|
| Compounding (parts by weight) | SBR [1] | 82.5 | 82.5 | 82.5 | 82.5 | 82.5 | 82.5 | 82.5 |
| | SBR [2] | 55 | 55 | 55 | 55 | 55 | 55 | 55 |
| | carbon black [3] | 80 | 80 | 55 | 55 | 55 | 55 | 75 |
| | silica [4] | — | — | 25 | 25 | 25 | — | 5 |
| | aluminum hydroxide [5] | — | — | — | — | — | 25 | — |
| | silane coupling agent [6] | — | — | 2.5 | 2.5 | 2.5 | — | 0.5 |
| | aromatic oil | 7.5 | 7.5 | 7.5 | 7.5 | 7.5 | 7.5 | 7.5 |
| | recrosslinking inhibition assistant [7] | — | 1.0 | — | 2.0 | — | 2.0 | 2.0 |
| | 4-methyl-DM [8] | — | — | — | — | 3.0 | — | — |
| | sulfur | 1.5 | 1.5 | 1.5 | 1.5 | 1.5 | 1.5 | 1.5 |

TABLE 5-continued

| Kind of rubber | | IIIA | IIIB | IIIC | IIID | IIIE | IIIF | IIIG |
|---|---|---|---|---|---|---|---|---|
| Wet-$\mu$ (index) | | 100 | 100 | 106 | 106 | 106 | 107 | 102 |
| Initial | hardness (Hd) | 60 | 60 | 61 | 61 | 61 | 60 | 60 |
| | M300 | 11.0 | 11.2 | 10.5 | 10.8 | 11.0 | 10.0 | 10.8 |
| After aging at | hardness (Hd) | 67 | 64 | 68 | 64 | 63 | 63 | 64 |
| 100° C. × 48 h | M300 | 18.2 | 16.8 | 17.1 | 14.6 | 13.8 | 13.3 | 14.7 |
| | thermal curing ratio of M300 (%) | 165 | 148 | 163 | 135 | 125 | 133 | 136 |

(1) Trade name: #1712, made by JSR Corporation
(2) Trade name: #1721, made by JSR Corporation
(3) Trade name: Seast 3H
(4) Trade name: Nipsil AQ, made by Nippon Silica Kogyo K.K.
(5) Trade name: Higirite 43H, made by Showa Denko K.K.
(6) Trade name: Si69, made by Degussa
(7) zinc O,O'-diisopropyl dithiophosphate
(8) bis (4-methylbenzothiazolyl-2)-disulfide Then, the wet performances are evaluated by the same method as described in Example 1 with respect to each of the above tires at three kinds of new tire stage, middle worn stage (remaining groove depth: 5 mm, before the exposure of the base rubber) and last worn stage (remaining groove depth: 2 mm). The evaluation results are shown in Table 6.

TABLE 6

| | | Comparative Example 4 | Example 9 | Example 10 | Example 11 | Example 12 | Example 13 | Example 14 |
|---|---|---|---|---|---|---|---|---|
| Kind of rubber | cap rubber | IIIA | IIIA | IIIB | IIIB | IIIB | IIIB | IIIB |
| | base rubber | IIIA | IIIB | IIIG | IIIC | IIID | IIIE | IIIF |
| Tread structure | width of base rubber to ground contact width of tread (%) | — | 60 | 60 | 60 | 60 | 60 | 60 |
| | ratio of outer surface of base rubber, from groove bottom to depth of main structure groove (%) | — | 50 | 50 | 50 | 50 | 50 | 50 |
| | cap rubber/base rubber (volume ratio) | — | 1:0.7 | 1:0.7 | 1:0.7 | 1:0.7 | 1:0.7 | 1:0.7 |
| | cap rubber: base rubber in block (volume ratio) | — | 6:4 | 6:4 | 6:4 | 6:4 | 6:4 | 6:4 |
| Wet performance (new tire) | | 6.5 | 6.5 | 6.5 | 6.5 | 6.5 | 6.5 | 6.5 |
| Wet performance (middle worn stage: remaining 5 mm) | | 5.0 | 5.5 | 5.5 | 5.5 | 5.5 | 5.5 | |
| Wet performance (last worn stage: remaining 2 min) | | 4.0 | 4.5 | 5.0 | 5.0 | 5.5 | 6.0 | 6.0 |
| Difference in wet performance between new tire and worn tire | | 2.5 | 2.0 | 1.5 | 1.5 | 1.0 | 0.5 | 0.5 |

Comparative Example 4 is a tire having the conventional type tread structure and is large in the difference of wet performance between new tire and worn tire. In Example 9, the slight improvement of the wet performance is observed at the last worn stage and the difference of wet performance is small as compared with that of Comparative Example 4. In Examples 10 and 11, the deterioration of wet performance at the middle worn stage is controlled, while the wet performance at the last worn stage is deteriorated, but the difference of wet performance between new tire and worn tire is small as compared with that of Comparative Example 4. In Examples 12, 13 and 14, the wet performance is maintained over a period from the middle worn stage to the last worn stage and the difference of wet performance from new tire stage is very small.

As mentioned above, in the pneumatic radial tire according to the invention, the tread portion is rendered into a particular cap/base structure and a recrosslinking inhibition assistant and/or inorganic compound powder is compounded into a base rubber, whereby the wet-$\mu$ at the last worn stage can effectively be enhanced without obstructing the productivity to control the degradation of the wet performances. Furthermore, the silence and ride comfort against vibrations on or after the middle worn stage are simultaneously improved.

What is claimed is:

1. A pneumatic radial tire comprising: a pair of ring-shaped bead cores, a bead filler disposed on each bead core, a carcass toroidally extending between the bead cores and being comprised of a rubberized ply containing plural cords arranged side by side in a radial direction and wound around each bead core from inside toward outside to form a turnup portion, a belt of plural belt layers arranged outward on the carcass in the radial direction, an annular tread portion disposed outward on the belt in the radial direction, and a pair of sidewall portions extending from both ends of the tread portion; said tread portion having a two-layer structure of a cap rubber layer disposed outward in the radial direction and a base rubber layer disposed inward in the radial direction, and an outer surface of said base rubber layer in the radial direction being existent in a position corresponding to not less than 20% of a depth of a main groove formed in said tread portion outward from a bottom of said main groove in the radial direction, and wherein said base rubber layer is compounded with a recrosslinking inhibition assistant and aluminum hydroxide as an inorganic compound powder; and said base rubber layer has a convex structure which is a main part of a ground contact region at a middle worn stage and then contacts with ground as a main part until at least an appearance of slip sign.

2. A pneumatic radial tire according to claim 1, wherein the base rubber layer is compounded with 0.5–5.0 parts by weight of the recrosslinking inhibition assistant based on 100 parts by weight of rubber ingredient.

3. A pneumatic radial tire according to claim 1, wherein the base rubber layer is compounded with not less than 10 parts by weight of the inorganic compound powder based on 100 parts by weight of rubber ingredient.

4. A pneumatic radial tire according to claim 1, wherein the inorganic compound powder is compounded into the base rubber layer in an amount of 10–100 parts by weight based on 100 parts by weight of rubber ingredient and into the cap rubber layer in an amount of not more than 50 parts by weight based on 100 parts by weight of rubber ingredient, respectively, provided that the compounding ratio of the inorganic compound powder in the base rubber layer is higher than that in the cap rubber layer.

5. A pneumatic radial tire according to claim 1, wherein the recrosslinking inhibition assistant is compounded into the cap rubber layer.

6. A pneumatic radial tire according to claim 1, wherein the recrosslinking inhibition assistant is a metal salt of dithiophosphoric acid, a thiuram vulcanization accelerator or a 4-methylbenzothiazole compound.

7. A pneumatic radial tire according to claim 1, wherein the base rubber layer contains short fibers.

8. A pneumatic radial tire according to claim 1, wherein the outer surface of the base rubber layer in the radial direction is existent in a position from the bottom of the main groove within a range of 30–90% of the main groove depth.

9. A pneumatic radial tire according to claim 8, wherein the outer surface of the base rubber layer in the radial direction is existent in a position from the bottom of the main groove within a range of 40–60% of the main groove depth.

10. A pneumatic radial tire according to claim 1, wherein a volume ratio of cap rubber layer to base rubber layer is in the range of 1:0.5 to 1.0:1.0.

11. A pneumatic radial tire according to claim 1, wherein the base rubber layer is arranged on a central zone of the tread portion at a width corresponding to 40–80% of a ground contact width of the tread portion.

12. A pneumatic radial tire according to claim 1, wherein a volume ratio of cap rubber layer to base rubber layer in each of blocks forming a tread pattern at a distance from the bottom of the groove to the outer surface of the tread portion in the radial direction is 9:1–2:8.

13. A pneumatic radial tire according to claim 1, wherein an area ratio of the base rubber layer to the cap rubber layer contacting with ground gradually increases with advance of wearing from a middle worn stage.

14. A pneumatic radial tire according to claim 1, wherein the friction coefficient of the base rubber layer on wet road surface is at least 105% of that of the cap rubber layer.

15. A pneumatic radial tire according to claim 1, wherein the cap rubber layer has a thermal curing ratio of 100–160% after a modulus of elasticity at 300% elongation (M300) is held at 100° C. for 48 hours and the base rubber layer has a thermal curing ratio of 100–150%, provided that the thermal curing ratio of the base rubber layer is lower than that of the cap rubber layer.

16. A pneumatic radial tire according to claim 1, wherein the base rubber layer contains not more than 55 parts by weight of an oil based on 100 parts by weight of rubber ingredient.

17. A pneumatic radial tire according to claim 1, wherein said base rubber layer comprises a rubber ingredient, a recrosslinking inhibition assistant and not less than 5 parts by weight of an inorganic compound powder per 100 parts by weight of the rubber ingredient.

* * * * *